US010316824B2

(12) United States Patent
Watkins

(10) Patent No.: US 10,316,824 B2
(45) Date of Patent: Jun. 11, 2019

(54) CAMBER CHANGING AND LOW DRAG WING FOR VERTICAL AXIS WIND TURBINE

(71) Applicant: Scharf Energy LLC, Adrian, MI (US)

(72) Inventor: Doyle E. Watkins, Britton, MI (US)

(73) Assignee: Scharf Energy LLC, Adrian, MI (US)

( * ) Notice: Subject to any disclaimer, the term of this patent is extended or adjusted under 35 U.S.C. 154(b) by 439 days.

(21) Appl. No.: 15/147,164

(22) Filed: May 5, 2016

(65) Prior Publication Data
US 2016/0327026 A1 Nov. 10, 2016

Related U.S. Application Data

(60) Provisional application No. 62/179,447, filed on May 7, 2015.

(51) Int. Cl.
*F03D 3/00* (2006.01)
*F03D 3/06* (2006.01)
*F03D 7/06* (2006.01)

(52) U.S. Cl.
CPC .............. *F03D 7/06* (2013.01); *F03D 3/005* (2013.01); *F03D 3/062* (2013.01); *F03D 3/067* (2013.01); *F05B 2210/16* (2013.01); *F05B 2240/211* (2013.01); *F05B 2240/313* (2013.01); *Y02E 10/74* (2013.01)

(58) Field of Classification Search
CPC .......................................................... F03D 7/06
See application file for complete search history.

(56) References Cited

U.S. PATENT DOCUMENTS

| 1,076,713 | A | * | 10/1913 | Southwick | F03D 3/067 416/119 |
| 3,442,493 | A | * | 5/1969 | Smith, Jr. | B64C 29/00 415/129 |
| 3,743,848 | A | * | 7/1973 | Strickland | F03D 3/067 290/44 |
| 3,978,345 | A | * | 8/1976 | Bailey | E02B 9/08 290/54 |
| 4,001,596 | A | * | 1/1977 | Kurtzbein | F03B 13/145 290/53 |
| 4,052,134 | A | * | 10/1977 | Rumsey | F03D 3/067 416/119 |
| 4,247,253 | A | * | 1/1981 | Seki | F03D 3/065 416/119 |
| 4,286,922 | A | * | 9/1981 | Lew | F03B 17/067 416/17 |
| 4,307,677 | A | * | 12/1981 | Jastram | B63H 25/40 114/144 R |
| 4,383,801 | A | * | 5/1983 | Pryor | F03D 3/068 416/119 |

(Continued)

Primary Examiner — Woody A Lee, Jr.
(74) Attorney, Agent, or Firm — Jacob M. Ward; Ward Law Office LLC

(57) ABSTRACT

A camber changing wing for a vertical axis wind turbine includes a main body, a pivoting slat, a first beam member, and a second beam member. The main body has front, rear, top and bottom portions. The pivoting slat is disposed adjacent to the front portion. The pivoting slat has a leading edge, and a top and bottom sides. Each of the beam members has a front end, a rear end, and a pivot point. The front end of the first beam member is coupled to the top side of the pivoting slat. The front end of the second beam member is coupled to the bottom side of the pivoting slat. The first beam member is rotatably attached to the top portion of the main body at the pivot point. The second beam member is rotatably attached to the bottom portion of the main body at the pivot point.

12 Claims, 7 Drawing Sheets

(56) References Cited

U.S. PATENT DOCUMENTS

| | | | | |
|---|---|---|---|---|
| 4,684,817 A | * | 8/1987 | Goldwater | F03D 3/067 290/55 |
| 5,256,034 A | * | 10/1993 | Sultzbaugh | F03D 3/061 415/914 |
| 5,518,367 A | * | 5/1996 | Verastegui | F03D 3/061 416/119 |
| 6,320,273 B1 | * | 11/2001 | Nemec | F03D 3/005 290/55 |
| 6,734,576 B2 | * | 5/2004 | Pacheco | B60K 16/00 290/55 |
| 6,853,096 B1 | * | 2/2005 | Yu | F03D 3/067 290/43 |
| 7,077,628 B1 | * | 7/2006 | Acord | F03D 3/067 415/4.2 |
| 7,980,810 B2 | | 7/2011 | Unno | |
| 7,989,973 B2 | * | 8/2011 | Birkestrand | E02B 9/00 290/44 |
| 8,016,544 B1 | * | 9/2011 | Nguyen | F03D 3/067 415/130 |
| 8,657,575 B2 | * | 2/2014 | Morris | F03B 17/06 416/79 |
| 9,494,137 B2 | * | 11/2016 | Hwang | F03D 3/067 |
| 2007/0296218 A1 | * | 12/2007 | Jonsson | F03D 3/068 290/55 |
| 2008/0149779 A1 | * | 6/2008 | Phillips | B64C 3/52 244/201 |
| 2011/0194938 A1 | * | 8/2011 | Livingston | B63H 9/00 416/132 B |
| 2014/0064918 A1 | * | 3/2014 | Hurup | F03B 3/16 415/4.1 |
| 2015/0192105 A1 | * | 7/2015 | Chu | F03D 3/061 416/119 |

\* cited by examiner

CAMBER CHANGING AND LOW DRAG WING FOR VERTICAL AXIS WIND TURBINE

CROSS-REFERENCE TO RELATED APPLICATIONS

This application claims the benefit of U.S. Provisional Application No. 62/179,447 filed on May 7, 2015. The entire disclosure of the above application is hereby incorporated herein by reference.

FIELD

The present disclosure relates to wind turbines and, more specifically, to a vertical axis wind turbine with camber changing wings.

BACKGROUND

Windmill and wind turbine systems are generally either horizontal axis systems, where the rotating shaft is arranged in a horizontal direction, or vertical axis, where the rotating shaft is arranged in a vertical direction.

Vertical axis wind turbines rotate in the same position irrespective of wind direction, whereas horizontal axis wind turbines must be positioned to face the wind direction in order to rotate. Advantageously, vertical axis wind turbines also rotate with relatively silent movement and fit into most landscapes.

There are a variety of conventional wings or blades used with vertical axis wind turbines, including the well-known Savonius and Darrieus designs. Multiple bladed types with convex and concave shaped wings are also used. Additional blade designs have included flaps out the back of the blade. Some blades are known to bend in the middle. Other conventional blade designs are mechanically linked to always face the best angle of attack, often using elaborate mechanical devices with which they achieve the linkage.

One particular wing design is described in U.S. Pat. No. 7,980,810 to Unno. The Unno patent describes a vertical axis wind turbines having a substantially vertical rotating shaft, a plurality of substantially vertical blades fixedly secured to the shaft, each of the blades further including a front portion, a rear portion, and a pivot axis pivotally securing the rear portion to the front portion. The rear portion is operatively arranged to pivot relative the front portion. The blades additionally include bottom edges positioned on each of the front portions. Each of the bottom edges is arranged substantially equidistant from the shaft proximate a first circumference extending substantially horizontally about the shaft. The blades further include top edges positioned on each of the front portions. Each of the top edges is arranged substantially equidistant from the shaft proximate a second circumference extending substantially horizontally about the shaft. The second circumference is smaller than the first circumference These known wing or blade designs have certain deficiencies. Most notably, such blades receive airflow on one side to cause movement in one direction but, on the other side of the turbine, the blades are moving in a direction opposite of the same airflow. In this manner, the airflow that moves the blades in one direction can in fact oppose the movement of the blades in another direction. While the known wing or blade designs may change the angle of attached, the chamber of the known wing or blade designs remains the same and is therefore inefficient.

There is a continuing need for a more efficient wing for a vertical axis wind turbine, which is camber changing with minimal mechanical complexity. Desirably, the chamber changing wing also is self-regulating in speed during an operation of the vertical wind turbine.

SUMMARY

In concordance with the instant disclosure, a more efficient wing for a vertical axis wind turbine, which is camber changing with minimal mechanical complexity, and which is also self-regulating in speed during an operation of the vertical wind turbine, is surprisingly discovered.

In one embodiment, a camber changing wing for a vertical axis wind turbine includes a main body, a pivoting slat, a first beam member, a second beam member, a first master wing, and a second master wing. The main body has a front portion, a rear portion, a top portion, and a bottom portion. The pivoting slat is disposed adjacent to the front portion of the main body. The pivoting slat has a leading edge, a top side and a bottom side. Each of the first beam member and the second beam member has a front end, a rear end, and a pivot point disposed between the front end and the rear end. The front end of the first beam member is coupled to the top side of the pivoting slat. The front end of the second beam member is coupled to the bottom side of the pivoting slat. The first beam member is rotatably attached to the top portion of the main body at the pivot point of the first beam member. The second beam member is rotatably attached to the bottom portion of the main body at the pivot point of the bottom beam member. The first master wing is coupled to the rear end of the first beam member. The second master wing is coupled to the rear end of the second beam member.

In another embodiment, a vertical axis wind turbine includes a substantially vertical rotating shaft, and at least one substantially vertical camber changing wing secured to the rotating shaft. The rotating shaft may be coupled to an electrical generator or a pump, for example, for operation of the same using the wind.

In an exemplary embodiment, the vertical axis wind turbine of the present disclosure has a larger main fixed wing or body with a movable leading edge or slat connected to the main fixed wing through a single pivot point. The slat is driven by a smaller master streamlined wing or flap that follows the relative wind. As used herein, the term "relative wind" means the resultant airflow that occurs from the wind blowing and the wind that is generated by the rotation of the turbine wing.

The leading edge or slat changes position based on relative wind and is slave to a smaller master streamlined wing that is always in the relative wind. This is done from a single pivot point or axis, which causes the slat or the movable wing to move to the other side of the wing and puts the camber on the proper side based on relative wind and the direction of the wing. The camber changing wing has the ability to do this because of the mechanical advantage of the streamlined master wing over the slat. This causes the entire wing to have a proper orientation or camber throughout the entire duration of rotation.

This entire system of the present disclosure reduces the drag by lining up the relative wind through the streamlined master wing to reduce the drag from a direct head wind. All vertical axis wind turbine blades receive airflow on one side going one direction, and airflow on the other side going the opposite direction. If the camber of the wing, or the curvature of the wing cannot change, then it is efficient going in one direction but inefficient going in the other direction.

By way of example, the slats on an airplane wing always point down and they are mechanically driven. Airplane wings always receive the air from the same direction towards the flat side or the bottom of the wing. Vertical wind turbine wings, if flat on one side, will receive the air ½ on the flat side and ½ on the curved side. The slat will move to the other side of the wing and put the camber on the right side of the wing where it needs to be, because of the mechanical advantage that the streamlined wing has over the slat. This causes the entire wing to have the camber on the right side throughout the entire duration and be in the leading edge of the center when the wind is coming straight at it, reducing its drag to a minimum thus making it more efficient.

The camber changing wing accomplishes these advantages in the simplest forms. There are no linkages, no parallagrams, no cams, belts or chains, no push or pull rods. It is not subject to centrifugal loading because the center of gravity is at the single pivoting point. The main non-movable wing tapers to the trailing edge and is always in line with the plane of rotation; never pitching out or pitching in. Only the leading edge flap or slat moves in relation to the plane of rotation.

Since the wing has the low pressure in the front regardless of wind direction, the curve or camber of the wing is creating low pressure in the front regardless of relative wind. It is the most streamlined in a direct head wind, reducing drag and creating the highest efficiency possible for a vertical axis wind turbine blade or wing.

Another advantage to the camber changing wing of the present disclosure is that it creates the lowest drag point when in a direct head wind because of its shape and the ability to put the camber, while still reducing drag, on the proper side where the wind creates the greatest amount of lift. Bladed vertical axis wind turbines turn an average of 2½ times faster than the wind that is driving them, therefore creating the relative wind for the master wing to position the slat to an optimal point and multiple positions.

In operation, each individual wing will maintain an optimum driving force and minimum drag regardless of its position based on the wind. The system has the greatest startup position due to a maximum camber when the movement of the wing is initiated. The system also has the greatest driving force when spinning due to an optimized camber. This is because the camber is always in the right position based on relative wind, creating greater efficiency overall.

DRAWINGS

The above, as well as other advantages of the present disclosure, will become readily apparent to those skilled in the art from the following detailed description, particularly when considered in the light of the drawings described hereafter.

Figure 6:
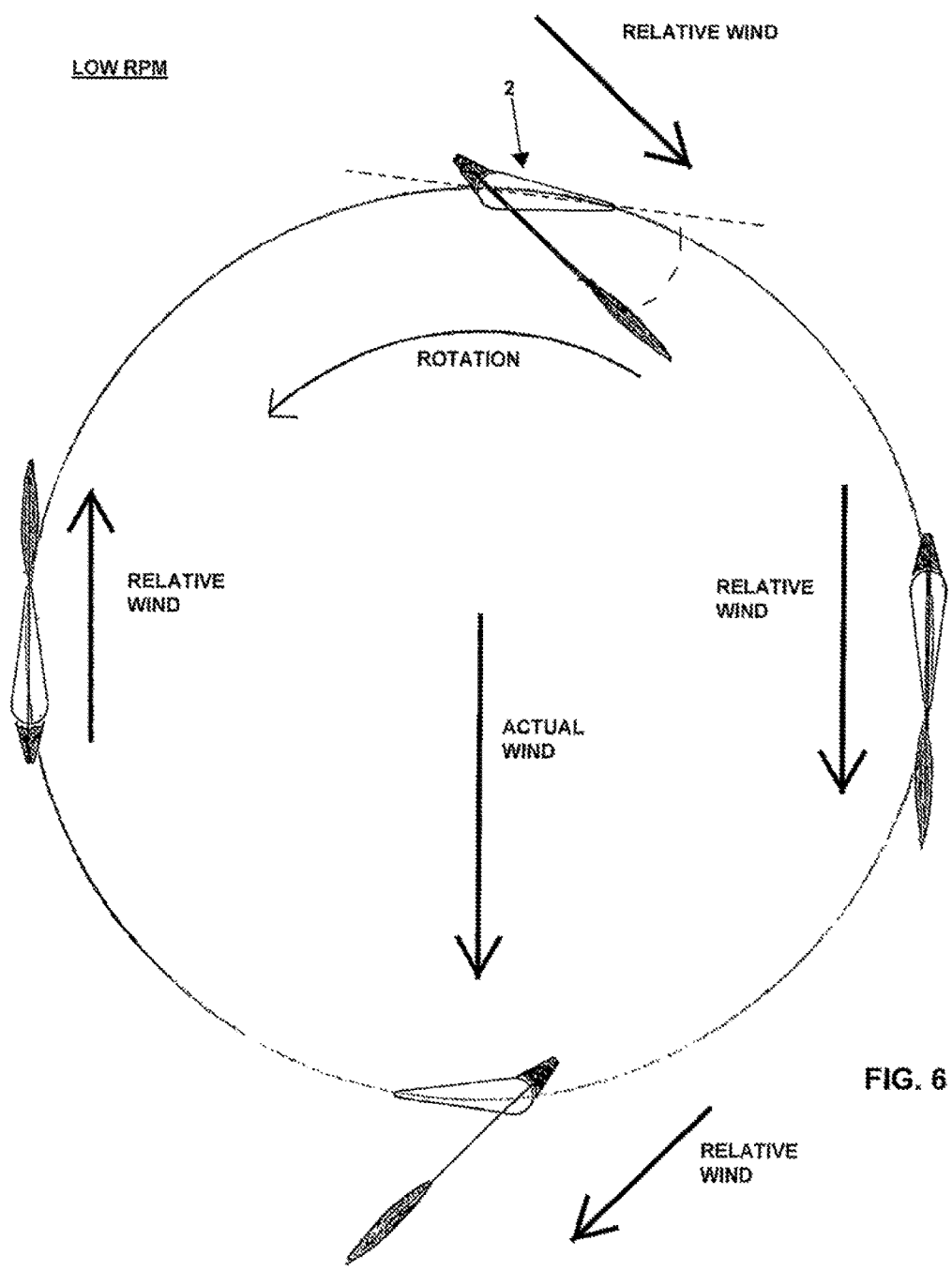
Figure 7:
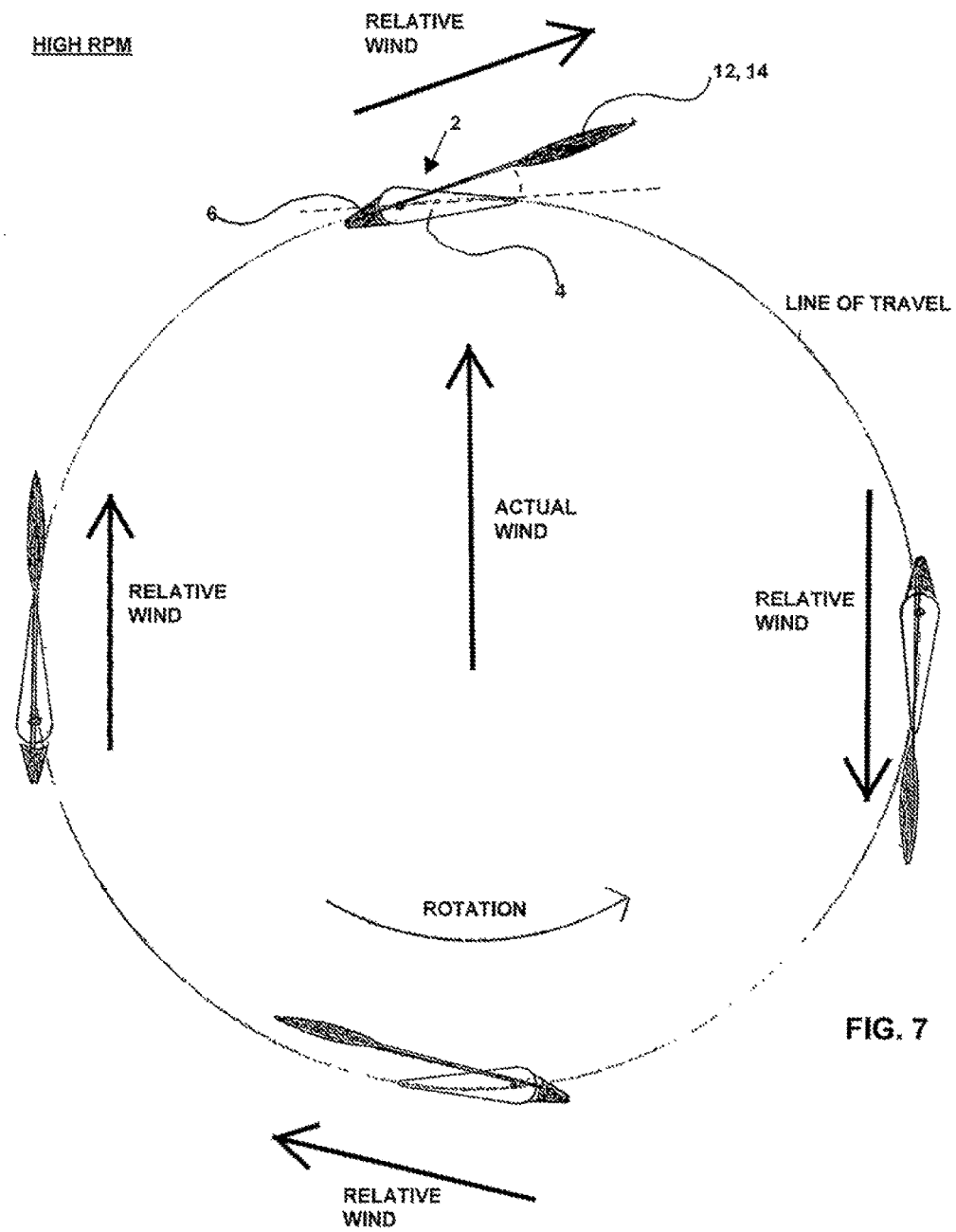

FIG. 6 is a schematic top plan view of a single one of the camber changing wings at various rotational positions relative to a directional wind and at a low number of revolutions per minute around a central axis; and FIG. 7 a schematic top plan view of a single one of the camber changing wings at various rotational positions relative to a directional wind and at a high number of revolutions per minute around a central axis to illustrate a self-regulation of the speed of the chamber changing wings in operation.

DETAILED DESCRIPTION

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature, and thus, is not necessary or critical.

As used herein, relative terms such as "up," "down," "upper," "lower," "top," "bottom," "above," and "beneath" are made with reference to the direction of gravity.

Figure 1:
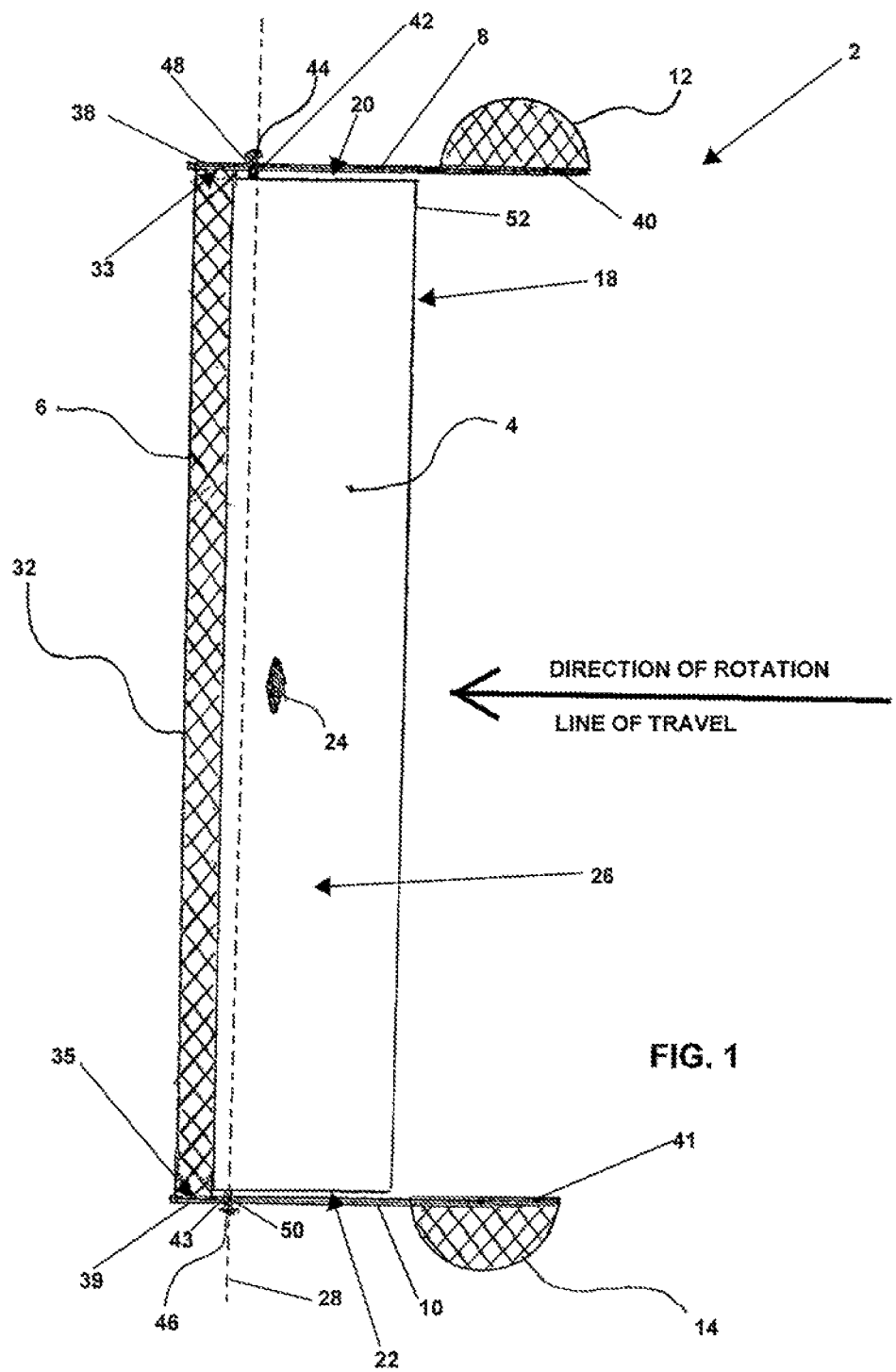
FIG. 1 is a side elevational view of a camber changing wing for a vertical axis wind turbine, according to one embodiment of the present disclosure.
Figure 2:
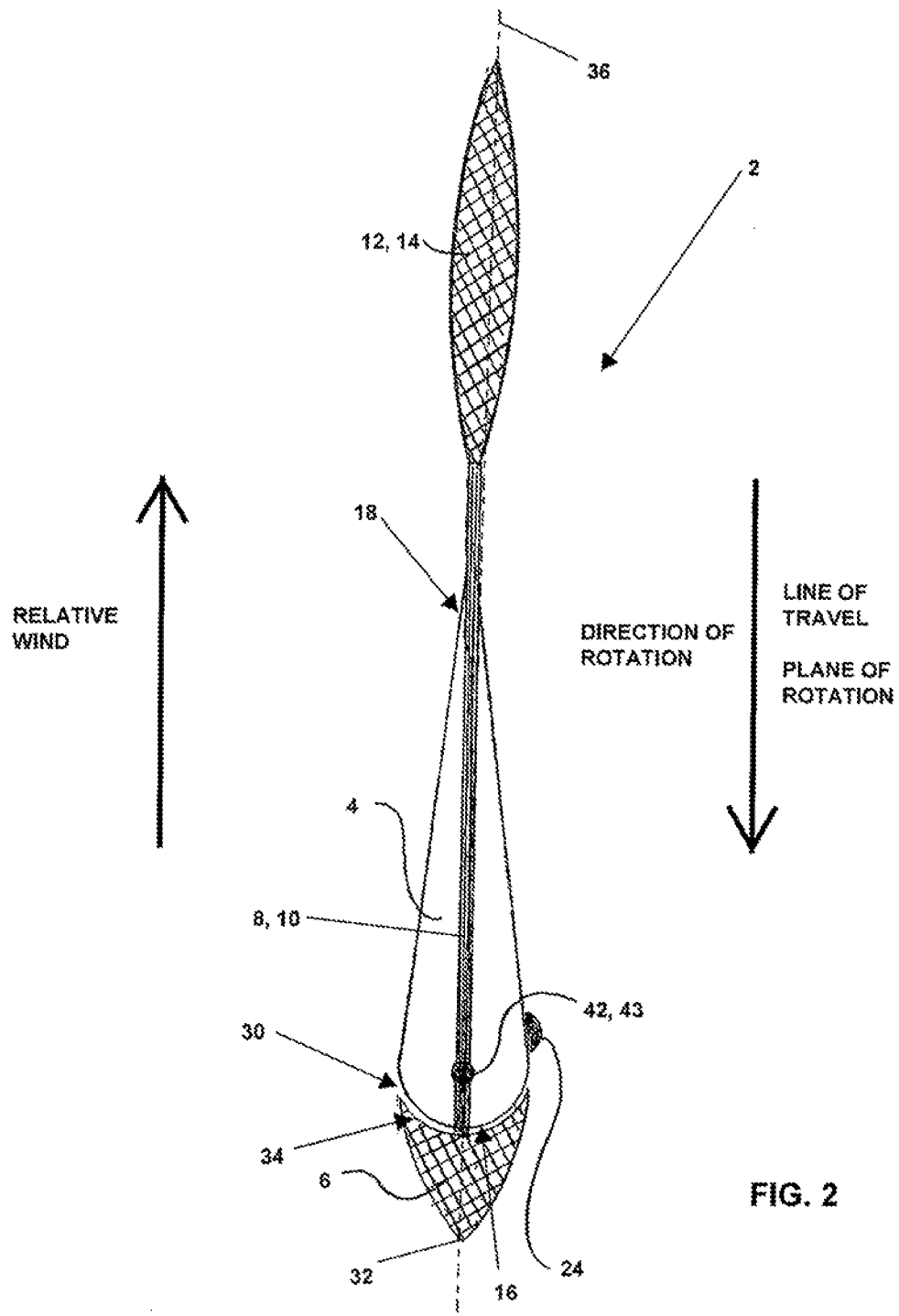
FIG. 2 is a top plan view of the camber changing wing depicted in FIG. 1.
Figure 3:
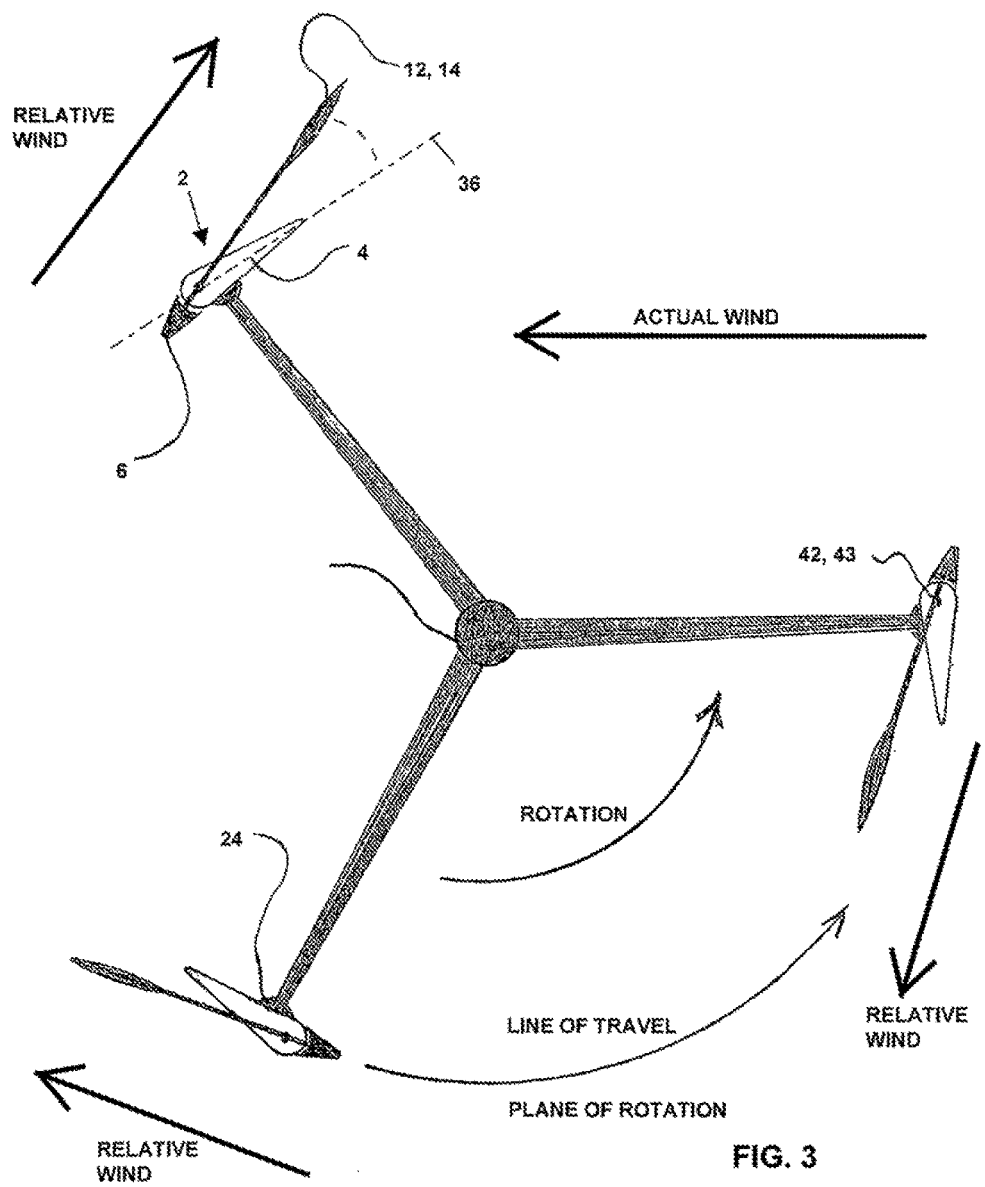
FIG. 3 is a top plan view of a vertical axis wind turbine with a plurality of camber changing wings, according to one embodiment of the present disclosure.
Figure 4:
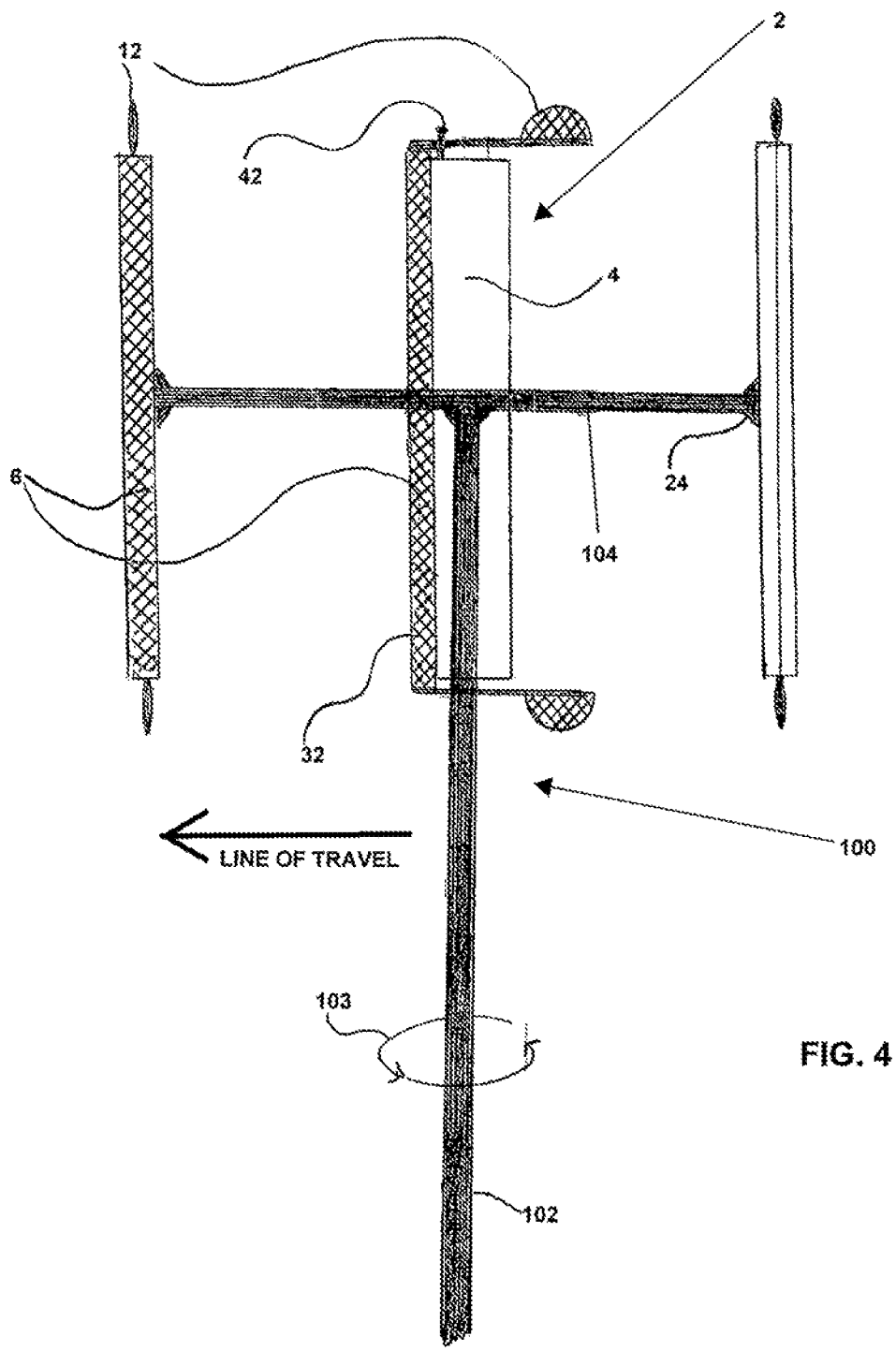
FIG. 4 is a side elevational view of the vertical axis wind turbine depicted in FIG. 3, the wings shown in one rotational position.
Figure 5:
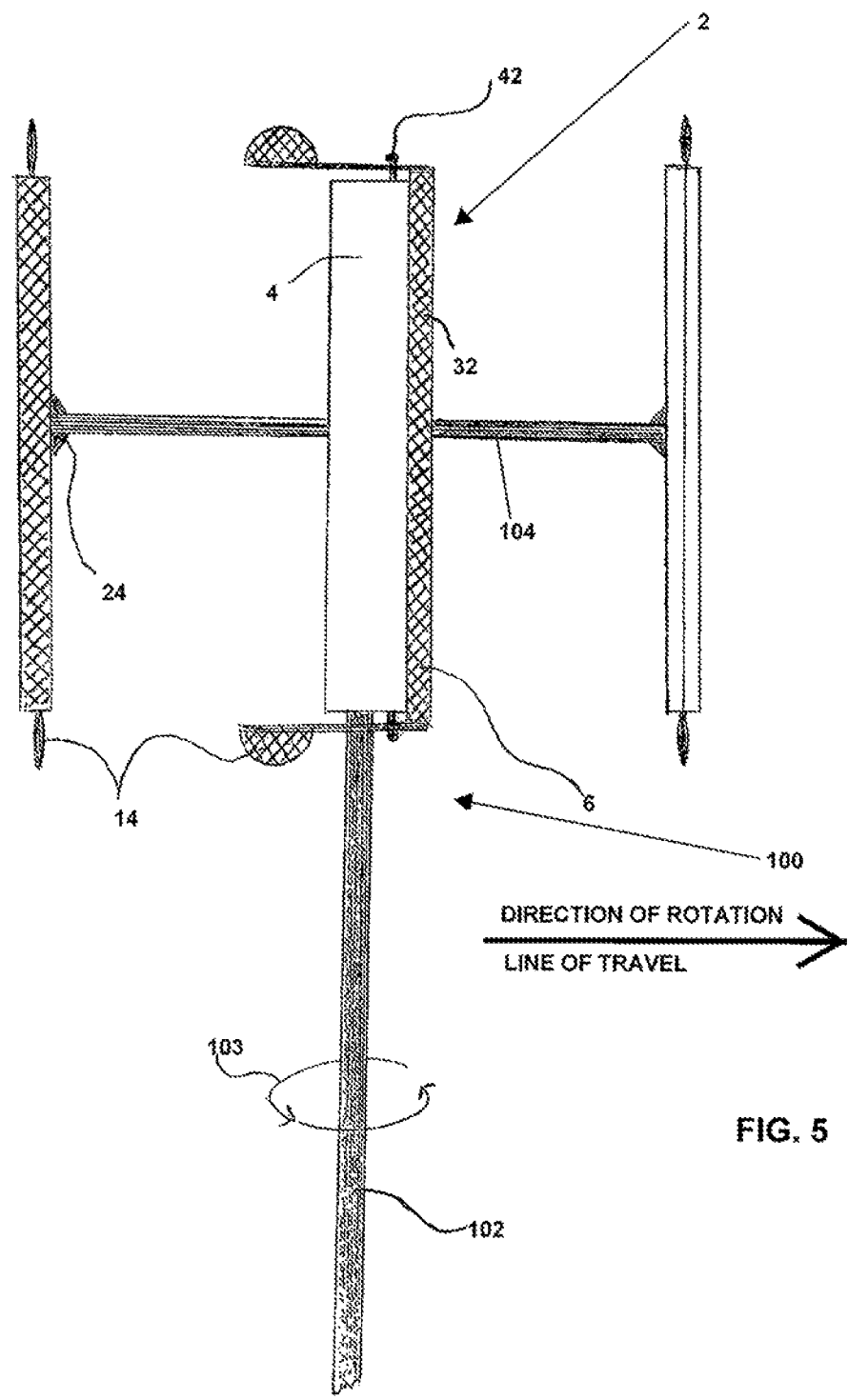
FIG. 5 is a side elevational view of the vertical axis wind turbine depicted in FIGS. 3-4, the wings shown in another rotational position.

A camber changing wing 100 according to one embodiment is shown in FIGS. 1-7. The camber changing wing 2 may be used with a substantially vertical axis wind turbine 100, for example, as illustrated in FIGS. 3-5. In a particular embodiment, the camber changing wing 2 includes a main body 4, a pivoting slat 6, a first beam member 8, a second beam member, 10, a first master wing 12, and a second master wing 14.

The main body 4 of the camber changing wing 2 has a front portion 16, a rear portion 18, a top portion 20, and a bottom portion 22. The main body 4 may further have an attachment point feature 24 configured to mate with a corresponding attachment feature (not shown) on an arm of the vertical axis wind turbine 100. As shown in FIG. 1, the attachment point feature 24 may be disposed on a side portion 26 of the main body 4 between the front portion 16 and the rear portion 18. Other suitable locations for the attachment point feature 24 may be selected by a skilled artisan, as desired.

As shown in FIG. 2, the front portion 16 of the main body 4 of the camber changing wing 2 may be rounded. The rear portion 18 of the main body 4 of the camber changing wing 2 may also be tapered relative to the front portion 16 of the main body 4. One of ordinary skill in the art may also select other suitable shapes for the main body 4 within the scope of the present disclosure.

The pivoting slat 6 of the camber changing wing 2 is disposed adjacent to the front portion 16 of the main body 4. The pivoting slat 6 has a leading edge 32, a top side 35 and a bottom side 37, The pivoting slat 6 is configured to freely pivot about an axis of rotation 28 disposed through the main body 4 from the top portion 20 to the bottom portion 22. For example, as shown in FIG. 2, there may also be a gap 30 disposed between the front portion 16 of the main body 4 and the pivoting slat 6 that allows for the free movement of the pivoting slat 6 relative to the main body 4.

The leading edge 32 of the pivoting slat 6 may be tapered relative to a remainder of the pivoting slat 6. A skilled artisan may select other suitable shapes for the pivoting slat 6 and the leading edge 32, as desired.

With continued reference to FIG. 2, the pivoting slat 6 has a trailing surface 34 that is disposed adjacent to the front portion 16 of the main body 4. In one example, the trailing surface 34 has a shape corresponding substantially to a shape of the front portion 16 of the main body 4. In certain embodiments, the trailing surface 34 of the pivoting slat 6 is concave and conforms to a rounded or convex outer surface of the front portion 16 of the main body 5.

It should be appreciated that the trailing surface 34 of the pivoting slat 6 is also configured to contact the main body 4, and militate against a rotation of the pivoting slat 6 about the axis of rotation 28 at a predetermined angle. For example, the predetermine angle may be approximately 45 degrees relative to an elongate axis 36 of the main body 4. Other suitable predetermined angles may also be selected by the skilled artisan within the scope of the present disclosure.

Referring to FIGS. 1-5, the camber changing wing 2 of the present disclosure further has the first beam member 8 and the second beam member 10. Each of the first beam member 8 and the second beam member 10 has a front end 38, 39, a rear end 40, 41, and a pivot point 42, 43. The pivot point 42, 43 is disposed between the front end 38, 39 and the rear end 40, 41. The front end 38 of the first beam member 8 is coupled to the top side 33 of the pivoting slat 6. The front end 39 of the second beam member 10 is coupled to the bottom side 35 of the pivoting slat 6. The first beam member 8 is rotatably attached to the top portion 20 of the main body 4 at the pivot point 42 of the first beam member 8. The second beam member 10 is rotatably attached to the bottom portion 22 of the main body 4 at the pivot point 43 of the bottom beam member 10.

Although described herein as having two beam members 10, 12, it should be appreciated that a single beam member or more than two beam members for connecting the pivoting slat 6 to the main body may also be used, as desired.

In a particular embodiment, the first beam member 8 may be rotatably attached to the main body 4 with a top axle 44 disposed on the top portion 20 of the main body 4. Likewise, the second beam member 10 may be rotatably attached to the main body 4 with a bottom axle 46 disposed on the bottom portion 22 of the main body 4. In this embodiment, the top axle 44 and the bottom axle 46 together define a location of the axis of rotation 28 that is disposed through the main body 4.

Additionally, the pivot point 42 of the first beam member 8 may be defined by a hole 48 formed through the first beam member 8. Likewise, the pivot point 43 of the second beam member 10 may be defined by a hole 50 formed through the second beam member 10. In this example, the top axle 44 is disposed through the hole 48 in the first beam member 8 and the bottom axle 46 is disposed through the hole 50 in the second beam member 10.

It should be appreciated that the top axle 44 and the bottom axle 46 are free rotating within the holes 48, 50, respectively. Rotation facilitating means such as bearings and the like may also be employed to facilitate the free rotation.

As non-limiting example, the top axle 44 and the bottom axle 46 may be formed directly on the main body 4, separately formed and attached to the main body 4, or provided as a single unitary structure disposed through the main body 4. In a particular example, the top axle 44 and the bottom axle 46 are provided by opposite ends of an elongate axle member disposed through an entirety of the main body 4 from the top portion 20 to the bottom portion 22 of the main body 4. Other means for providing a rotatable attachment of the first beam member 8 and the second beam member 10 to the main body 4 of the camber changing wing 2 may also be used within the scope of the present disclosure.

The camber change wing 2 may further have the first master wing 12 and the second master wing 14. The first master wing 12 is coupled to the rear end 40 of the first beam member 8. The second master wing 14 is coupled to the rear end 41 of the second beam member 10. In a particular example, the first master wing 12 is disposed on one side of the first beam member 8 and extends upwardly from the first beam member 8. Similarly, the second master wing 14 may be disposed on one side of the second beam member 41 and extends downwardly from the second beam member 41.

The first master wing 12 and the second master wing 14 may be spaced apart from a rearward edge 52 of the rear portion 18 of the main body 4. Each of the first master wing 12 and the second master wing 14 may have a substantially streamlined shape, for example. Suitable shapes, configurations, and locations for the first master wing 12 and the second master wing 14 may be selected by one ordinary skill in the art, as desired.

As shown in FIGS. 3-5, the camber changing wing 2 of the present disclosure may be used with the vertical axis wind turbine 100. The vertical axis wind turbine 100 includes at least one substantially vertical rotating shaft 102 to which at least one of the camber changing wing 2 is secured, for example, using the attachment point feature 24. The rotation shaft 102 has a rotational movement 103 in operation. The rotating shaft 102 may be in communication with an electrical generator, a pump, or the like for purposes of supplying movement or power by means of the rotational movement 103.

The at least one camber changing wing 2 may have a substantially vertical orientation, and therefore be oriented substantially parallel with the substantially vertical rotating shaft 102. The camber changing wing 2 may be secured to an arm 104 of, and spaced apart from, the vertical axis wind turbine 100, for example. In particular, the arm 104 is configured to hold the camber changing wing 2 at a substantially fixed distance from the rotation shaft 102.

In a particular embodiment, the vertical axis wind turbine 100 includes a plurality of the camber changing wings 2. The camber changing wings 2 may be positioned substantially equidistant about the rotating shaft 102, for example. In a most particular example, the vertical axis wind turbine 100 includes three to five camber changing wings 2. One of ordinary skill in the art may select other numbers of the camber changing wings 2, as desired.

In operation, the camber changing wing 2 of the present disclosure maintains an optimum driving force and minimum drag regardless of its position around the rotating shaft 102. This occurs because the of movement of the leading edge 32 of the pivoting slat 6 that is driven by the first and second master wings 12, 14 that follow the relative wind, as shown in FIGS. 3-7.

For example, as shown in FIGS. 3-7, the leading edge 32 of the pivoting slat 6 changes position based on relative wind and is a slave to the first and second master wings 12, 14 that are always in the relative wind. This causes the pivoting slat 6 to move to an opposite side of the main body 4 relative to the first and second master wings 12, 14, and place the cambers of the camber changing wing 2 on an optimum sided based on the relative wind and the direction of movement of the camber changing wing 2. This in turn reduces the drag on the camber changing wing 2 from the direct head wind by lining up the relative wind through the streamlined first and second master wings 12, 14.

With reference to FIGS. 6-7, it should also be understood that the camber changing wing 2 is self-regulating in speed during operation. In FIG. 6, which shows the operation of the wing at various locations during a low speed rotation around the vertical wind turbine 100, an angle of the combined pivoting slat 6, the first and second beam members 8, 10, and the first and second master wings 12, 14 relative to main body 4 aligns substantially with the relative wind. However, during a high speed rotation as shown in FIG. 7, the angle of the combined pivoting slat 6, the first and second beam members 8, 10, and the first and second master slats 12, 14 relative to main body 4 does not align substantially with the relative wind. The result of this change in angle with the rotational speed is that the camber changing wing 2 never exceeds a maximum rotational speed.

Advantageously, the camber changing wing 2 of the present disclosure is more efficient than many known wings when used with the vertical axis wind turbine 100. Unlike the prior art wings, which may change the angle of attack, the wing 2 of the present disclosure changes the camber, and thereby better minimizes drag. Additionally, the wing 2 is camber changing with minimal mechanical complexity, as it does not require gears, linkages or motors in order to change the camber. Also, as established above, the wing 2 is self-regulating in speed during an operation of the vertical wind turbine 100, without requiring any sensors or other mechanical or electromechanically governors to monitor or adjust the rotational speed.

While certain representative embodiments and details have been shown for purposes of illustrating the invention, it will be apparent to those skilled in the art that various changes may be made without departing from the scope of the disclosure, which is further described in the following appended claims.

What is claimed is:

1. A camber changing wing for a vertical axis wind turbine, comprising:
    a main body having a front portion, a rear portion, a top portion, and a bottom portion;
    a pivoting slat disposed adjacent the front portion of the main body, the pivoting slat having a leading edge, a top side and a bottom side, the pivoting slat freely pivoting about an axis of rotation disposed through the main body from the top portion to the bottom portion; and
    a first beam member and a second beam member, each of the first beam member and the second beam member having a front end, a rear end, and a pivot point disposed between the front end and the rear end, the front end of the first beam member coupled to the top side of the pivoting slat, the front end of the second beam member coupled to the bottom side of the pivoting slat, the first beam member rotatably attached to the top portion of the main body at the pivot point of the first beam member, and the second beam member rotatably attached to the bottom portion of the main body at the pivot point of the bottom beam member.

2. The camber changing wing of claim 1, wherein the front portion of the main body is rounded.

3. The camber changing wing of claim 1, wherein the rear portion of the main body is tapered relative to the front portion of the main body.

4. The camber changing wing of claim 1, wherein the leading edge of the pivoting slat is tapered relative to a remainder of the pivoting slat.

5. The camber changing wing of claim 1, wherein the pivoting slat has a trailing surface that is disposed adjacent to the front portion of the main body, the trailing surface having a shape corresponding substantially to a shape of the front portion of the main body.

6. The camber changing wing of claim 5, wherein the trailing surface of the pivoting slat is concave.

7. The camber changing wing of claim 1, further comprising a first master wing and a second master wing, the first master wing coupled to the rear end of the first beam member, and the second master wing coupled to the rear end of the second beam member.

8. The camber changing wing of claim 7, wherein the first master wing is disposed on one side of the first beam member and extends upwardly from the first beam member, and the second master wing is disposed on one side of the second beam member and extends downwardly from the second beam member.

9. The camber changing wing of claim 7, wherein the first master wing and the second master wing are each spaced apart from a rearward edge of the rear portion of the main body.

10. The camber changing wing of claim 1, further comprising a top axle disposed on the top portion of the main body, and a bottom axle disposed on the bottom portion of the main body, the top axle and the bottom axle together defining the axis of rotation through the main body.

11. The camber changing wing of claim 10, wherein the pivot point of the first beam member is defined by a hole formed through the first beam member, and the pivot point of the second beam member is defined by a hole formed through the second beam member, the top axle disposed through the hole in the first beam member and the bottom axle disposed through the hole in the second beam member.

12. The camber changing wing of claim 9, wherein the top axle and the bottom axle are provided by opposite ends of an elongate axle member disposed through an entirety of the main body from the top portion to the bottom portion of the main body.

* * * * *